United States Patent Office 2,809,911
Patented Oct. 15, 1957

2,809,911

LAMINATING SOLUTIONS, LAMINATING STOCK, AND LAMINATED PRODUCTS

Henry M. Richardson, Springfield, Mass., assignor to Atlas Powder Company, Wilmington, Del., a corporation of Delaware No Drawing. Application May 6, 1954,
Serial No. 428,112

23 Claims. (Cl. 154—121)

This invention relates to laminated products and to laminating solutions and laminating stock used in preparing such products. More particularly, it relates to laminating solutions particularly adapted to the preparation of laminating stock and laminated forms from cellulosic sheet material.

It is an object of the invention to provide novel laminating solutions of resinous compositions.

Another object is to provide laminating solutions containing both polymerizable polyester resin compositions and water-soluble melamine formaldehyde condensation products.

A further object is to provide non-blocking resin-impregnated curable laminating stock from cellulosic sheet material.

It is also an object of the invention to provide cured laminates from resin-impregnated cellulosic sheet material of superior physical and electrical properties.

Other objects will become apparent in the course of the following description of the invention and in the appended claims.

Laminating solutions provided in accordance with the invention comprise resin or resin-forming components and mixed solvent components as hereinafter more fully described.

The major resin component is a polymerizable polyester of a polyhydric alcohol and a polybasic acid characterized by the fact that at least a major proportion of the acid is an alpha-beta unsaturated dicarboxylic acid and at least a major proportion of the polyhydric alcohol is a dihydric alcohol conforming to the formula

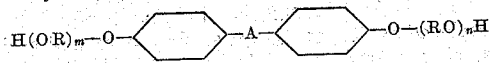

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 3.

Polyester resins so defined thus include esters of, for example, maleic, fumaric, itaconic, mesaconic and endomethylene tetrahydro phthalic acid, or mixtures of such acids with minor proportions of, for example, phthalic, succinic, adipic, sebacic, chlorinated phthalic, iso-phthalic, or terephthalic acid, and the like. The alcohol radicals of the polyesters are from diols such, for example, as the di-(hydroxy propyl) ether of 2,2-di(4-hydroxyphenyl) propane or the di-(hydroxyethyl) ether of 2,2-di-(4-hydroxyphenyl) butane, taken separately or in admixture with minor proportions of other dihydric alcohols such, for example, as ethylene glycol, propylene glycol, trimethylene glycol, the lower polyalkylene glycols, the several butylene glycols, hexylene glycols, cyclohexane diols, xylylene glycols and the like. Of the polyesters conforming to the definition preferred members for use in the laminating solution of the present invention are maleates and fumarates of symmetrical di-(hydroxyalkyl) ethers of 2,2-di-(4-hydroxyphenyl) propane. More specifically preferred is the fumarate of 2,2-di-(4-hydroxypropoxy phenyl) propane. The said members are readily friable solids at room temperature with melting points above 80° C., and preferably above 90° C.

In addition to the said polyester resin, laminating solutions of the invention may contain a vinyl monomer copolymerizable therewith. Among suitable vinyl monomers may be named aromatic vinyl compounds, such as styrene, vinyl toluene, or divinyl benzene; and allyl esters such as diallyl phthalate, diallyl phenyl phosphonate, triallyl cyanurate, or diallyl ester of ethylene glycol dicarbonate. To avoid excessive loss of the monomer upon evaporation of solvent from the laminating solution, the vinyl monomers, if employed, are selected from those having a boiling point of at least 100° C. The laminating solutions of the invention also contain water-soluble melamine formaldehyde condensation products.

The said resinous or resin forming components are present, in the laminating solutions of the invention, in a mixed solvent comprising a major proportion of a volatile, water-soluble ketone and water. Particularly to be mentioned as water-soluble ketones are acetone and methyl ethyl ketone. Of these, the latter is preferred.

In addition to the elements named above, it is frequently advantageous to include in a laminating solution in accordance with the invention, a vinyl polymerization catalyst. The catalyst is selected in accordance with the time-temperature cycle to be employed in the preparation of laminates from stock impregnated with the solution. Suitable catalysts include organic peroxides, "per" acids and the esters of "per" acids. Among such may be named benzoyl peroxide, succinyl peroxide, peracetic acid, tertiary butyl per-benzoate and like.

The relative proportions of the several ingredients in the laminating solutions of the invention may vary over a considerable range. The solvent may contain from 15% to 40% by weight of water the balance being a water-soluble ketone as hereinbefore described. In preferred compositions the water content of the solvent ranges from 20 to 25%.

The solids content of laminating solutions in accordance with the invention may be adjusted to control the viscosity thereof, thus controlling the amount picked up by the cellulosic material during impregnation. In general solutions containing from 40 to 60% solids by weight are useful. Preferred solutions contain about 50% solids. Of the resinous components of the solution from 15 to 25% by weight is a water-soluble melamine-formaldehyde condensation product and the balance is a polymerizable polyester resin composition.

Useful laminating solutions are obtained when the polymerizable polyester resin composition is made up solely of a polyester resin as hereinbefore defined and also when it contains a vinyl monomer in proportion to yield up to 1.0 vinyl group per unsaturated acid residue in the polyester. Preferred laminating solutions are those in which a proportion of vinyl monomer is employed to provide from 0.5 to 0.8 vinyl groups per unsaturated acid residue.

When the solutions contain catalyst the amount thereof will vary with the choice of catalyst and the curing conditions to be employed in assembling the finished laminate. As much as 10% of catalyst (based on the weight of polyester and vinyl monomer) although smaller amounts ranging from 2% to 5% will usually be found more satisfactory.

In preparing laminating solutions in accordance with the invention it is convenient to dissolve the melamine-formaldehyde condensation product in water and the other resinous components in a water-soluble ketone separately. Such solutions are stable on storage at room temperature for at least a week. When they are mixed in proportions to furnish overall compositions within the ranges of proportions above described they form clear solutions which are stable for several hours and may be employed to impregnate sheets of cellulosic material in the production of laminating stock of superior quality. When the impregnated sheets are freed from solvent by drying at a temperature below 100° C., they are non-tacky and can be stacked or rolled for storage. They may be held at ordinary temperatures for periods of several weeks without advancement of the resins to an infusible condition. The impregnated sheets are of moderate flexibility and are easily handled. Several of the sheets may be laid together and subjected to heat and pressure to form laminates of good water resistance, high impact strength and excellent electrical properties. A particularly valuable property of paper laminates employing the laminating solution of the invention is their punchability. Intricate shapes may be formed from such laminates by punching, thus avoiding more expensive and time consuming machining processes.

The following examples are illustrative of laminating solutions made in accordance with this invention, and of the process of preparing laminating stock therefrom. In the examples, all recited parts and percentages are by weight unless otherwise specified.

EXAMPLE 1

*Solution A*

300 parts of the fumarate polyester of 2.2 di (hydroxy-propoxyphenyl) propane, 62 parts of diallyl phthalate and 12 parts of tert-butyl perbenzoate were dissolved in 300 parts of methyl ethyl ketone. The solution was slightly hazy but stable.

*Solution B*

A water-soluble melamine-formaldehyde resin (Resimene 814 from Monsanto Chemical Co.) was dissolved in its own weight of water. The solution was clear and stable for at least one week.

*Laminating solution*

4 parts of Solution A was mixed with 1 part of Solution B to form a clear solution of approximately 180 centipoises viscosity. The solution remained clear for about 6 hours, then began to develop a haze, and finally after about 10 hours deposited an insoluble precipitate. The clear solution is an excellent impregnant for cellulosic sheet material in the preparation of laminating stock.

*Preparation of laminating stock*

No more solution should be prepared at one time than will be consumed before the insoluble precipitate forms, and preferably before the solution becomes hazy. Sheets of 75-pound alpha-body cellulose paper were dipped briefly in the solution, allowed to drain, and hung to dry overnight at room temperature. They were then placed in an oven at 150° F. for 1¼ hours. The dried, impregnated sheets had much the texture of a heavy parchment paper, and were completely non-tacky.

*Preparation of a cured laminate*

Eight plies of the impregnated sheets were laid together and pressed between highly polished plates at a pressure of 625 pounds per square inch for 10 minutes at 280° F. There was formed a strong, well-bonded laminate, light yellow in color, partially translucent, and uniformly impregnated. The resin content of the laminate was 66.6%. Cut samples thereof absorbed only 0.41% of their weight when submerged in water for 24 hours. The impact strength was 0.25 ft. pounds per inch notch. The dielectric strength, measured by ASTM method D709–52T, was greater than 55 kv. and the arc resistance was 78 seconds.

Laminates of higher cellulose to resin ratio were obtained by passing the sheets as they emerge from the dipping vessel between squeeze rolls. Operating with moderately tight squeeze rolls impregnated paper was obtained which yielded a laminate containing 42% resin. The electrical properties were essentially the same as before (arc resistance=76 seconds, dielectric strength greater than 55 kv.). The impact strength was significantly greater (0.44 ft. pounds per inch notch) and the 24-hour water absorption somewhat higher (1.38%).

EXAMPLE 2

The diallyl phthalate of Example 1 was replaced with 60 parts of diallyl phenyl phosphonate. The laminating solution obtained by mixing 4 parts of Solution A (as modified) with 1 part of Solution B, had a viscosity of approximately 200 cps.

Sheets of 75-pound alpha-body cellulose paper were impregnated and dried by the method described in Example 1. The laminating stock so prepared was superficially dry; non-tacky and easily handled. Laminates made therefrom were strong and well formed. They contained 55% resin and showed a 24-hour water absorption value of 1.48%.

EXAMPLE 3

The diallyl phthalate of Example 1 was replaced by 72.5 parts of bis-allyl glycol carbonate. The resulting laminating solution had a viscosity of 200 cps. Sheets of 75-pound alpha-body cellulose paper were impregnated by dipping in the manner described in Example 1 and laminates prepared therefrom. The resulting laminates were well formed and strong. The resin content was 56% and the laminates absorbed 0.65% water in the 24-hour absorption test.

EXAMPLE 4

A laminating solution was prepared as in Example 1, except that in Solution A the diallyl phthalate was replaced by 29.8 parts of vinyl toluene and the tert-butyl perbenzoate was replaced by benzoyl peroxide. The laminating solution, obtained by mixing 4 parts of the Solution A so-modified with 1 part of Solution B, was clear and had a viscosity of 200 cps. Laminating stock prepared from 75-pound alpha-body cellulose paper in the manner described in Example 1 yielded laminates which were strong and well formed. The resin content was 70% and the 24-hour water absorption was 0.28%.

EXAMPLE 5

A laminating solution was prepared as in Example 1 with the exception that the diallyl phthalate of Solution A was replaced by 50.5 parts of triallyl cyanurate. Laminating stock prepared from 75-pound alpha-body cellulose paper in the manner described in Example 1 yielded laminates which were strong and well formed. The resin content was 66.6% and the 24-hour water absorption was 0.61%.

EXAMPLE 6

A laminating solution was prepared as in Example I with the exception that a different water-soluble melamine-formaldehyde condensation product was employed in Solution B. The Resimene 814 of Monsanto was replaced by Melmac 405 (American Cyanamid Corp.). The viscosity of the clear laminating solution obtained by mixing one part of this modified Solution B with 4 parts of Solution A was 180 cps. Laminating stock prepared from 75-pound alpha-body cellulose paper in the manner described in Example 1 yielded laminates which were strong and well formed. The resin content was 56% and the 24-hour water absorption value was 0.86%.

EXAMPLE 7

The laminating solution of Example 1 was employed to impregnate 8-ounce cotton duck and dried. The fabric was thereby considerably stiffened but was non-tacky and readily handled. 8-ply laminates of the stock were prepared and cured by the method of Example 1. They were very strong and well formed. The resin content was 44% and the 24-hour water absorption value was 1.3%.

EXAMPLE 8

A laminating solution was prepared by mixing 6 parts of solution A (Example 1) with 1 part of Solution B (Example 1). The solution was clear upon mixing but was somewhat less stable than that of Example 1 in that haziness and precipitation developed somewhat more rapidly. Laminating stock prepared from this solution and 75-pound alpha-body cellulose paper were converted into laminates as described in Example 1. The resulting laminate contained 56% resin.

The fumarate polyester of 2.2-di(4-betahydroxy ethoxy phenyl) propane may be substituted for the polyester of this example.

EXAMPLE 9

A laminating solution was prepared as in Example 1 except that the vinyl monomer, diallyl phthalate, was eliminated and nothing was used in its place. Laminating stock was prepared as described in Example 1 and used in the preparation of 8 ply laminates. The resin content was 63% and the laminates absorbed 0.55% water in the 24-hour absorption test.

The maleate polyester of an equimolar mixture of ethylene glycol and 2.2-di(4-betahydroxy ethoxy phenyl) propane may be substituted for the polyester of this example.

It is to be recognized that laminating stock and laminated products in accordance with this invention may be prepared by means which do not employ the laminating solutions particularly described herein. For example, cellulosic sheet material may first be impregnated with an aqueous solution of a water-soluble melamine-formaldehyde resin and dried, and subsequently impregnated with a polyester resin or a co-polymerizable mixture of a polyester resin and a vinyl monomer as hereinbefore defined, from solution in any suitable solvent such as a water-soluble ketone, an aromatic hydrocarbon or a volatile ester. Upon evaporation of the solvent, the doubly impregnated cellulosic sheet material comprises laminating stock which is the equivalent of that obtained by the single step impregnation from a mixed resin solution as described in the specific examples above. Laminating stock so prepared and laminated products formed therefrom are considered to be within the purview of the invention.

The preferred method of preparing laminating stock in accordance with the invention is to employ the mixed resin solution whereby the cellulosic sheet material is impregnated with melamine-formaldehyde condensation products and the polymerizable polyester resin composition simultaneously. Besides the obvious operational advantage of completing the impregnation with a single dipping and a single drying step, the mixed resin method may be applied to cellulosic sheet material of low wet strength without the use of special precautions to avoid damage thereto.

In compounding the laminating solutions of the invention water-soluble melamine-formaldehyde resin of low degree of polymerization are to be employed. Otherwise, the resins though still water-soluble may not be completely soluble in the ketone-water mixture of the complete solution. In the two-stage process of impregnation melamine-formaldehyde resins which are further advanced may be employed provided they are still water-soluble.

What is claimed is:

1. A laminating solution comprising a polymerizable polyester of a polybasic acid of which at least the major proportion is an alpha-beta unsaturated dicarboxylic acid and a polyhydric alcohol of which at least the major proportion is a diol conforming to the formula

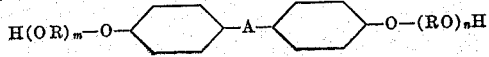

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 3; a water-soluble melamine-formaldehyde condensation product; water; and a water-soluble ketone solvent for the polyester.

2. A laminating solution as in claim 1 wherein the said polyester is the fumarate of a diol conforming to the said formula.

3. A laminating solution as in claim 2 wherein the said polyester is the fumarate of 2.2-di(4-hydroxypropoxy phenyl) propane.

4. A laminating solution comprising a polymerizable polyester of a polybasic acid of which at least the major proportion is an alpha-beta unsaturated dicarboxylic acid and a polyhydric alcohol of which at least the major proportion is a diol conforming to the formula

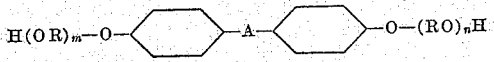

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 3; a vinyl monomer which has a boiling point above 100° C. and is copolymerizable with the polyester; a water-soluble melamine-formaldehyde condensation product; water, and a water-soluble ketone solvent for the polyester and monomer.

5. A laminating solution as in claim 4 wherein the said polyester is the fumarate of a diol conforming to the said formula.

6. A laminating solution as in claim 5 wherein the said polyester is the fumarate of 2.2-di(4-hydroxypropoxy phenyl) propane and the vinyl monomer is diallyl phthalate.

7. A laminating solution comprising from 40 to 60% by weight of resinous and resin forming ingredients and from 60 to 40% solvent wherein from 15 to 25% of the said resinous and resin forming ingredients is a water-soluble melamine-formaldehyde condensation product and the balance is a copolymerizable mixture of a polyester of a polybasic acid containing at least a major proportion of an alpha-beta unsaturated dicarboxylic acid and a polyhydric alcohol containing at least a major proportion of a diol conforming to the formula

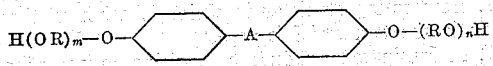

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 3, with a polymerizable vinyl monomer in proportions to yield up to 1.0 vinyl groups per unsaturated acid residue in the polyester; and wherein from 15 to 40% by weight of said solvent is water and the balance is a volatile, water-soluble ketone.

8. A laminating solution as in claim 7 wherein the said resinous and resin forming ingredients consist essentially of 67% by weight of the fumarate polyester of 2.2-di(4-hydroxypropoxy phenyl) propane, 14% diallyl phthalate, 19% water-soluble melamine-formaldehyde condensation product and a vinyl polymerization catalyst; wherein the said solvent consists essentially of 22% by weight of water and 78% methyl ethyl ketone.

9. A process of preparing laminating stock which comprises impregnating cellulosic sheet material by dipping in the laminating solution of claim 1, removing excess solution therefrom, and drying the impregnated sheets.

10. A process of preparing laminating stock which comprises impregnating cellulosic paper by dipping in the laminating solution of claim 8, removing excess solution therefrom, and drying the impregnated sheets at a temperature below 100° C.

11. Dry non-tacky laminating stock comprising cellulosic sheet material impregnated with a water-soluble melamine-formaldehyde condensation product and with a polymerizable polyester of a polybasic acid of which at least the major proportion is an alpha-beta unsaturated dicarboxylic acid and a polyhydric alcohol of which at least the major proportion is a diol conforming to the formula

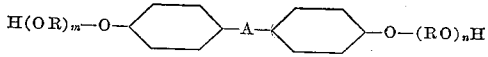

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 3.

12. Laminating stock as in claim 11 wherein the said cellulosic sheet material is paper.

13. Laminating stock as in claim 11 wherein the said cellulosic sheet material is a woven cotton fabric.

14. Dry, non-tacky laminating stock comprising cellulosic sheet material impregnated with a water-soluble melamine-formaldehyde resin and with a copolymerizable mixture of a polymerizable vinyl monomer and a polymerizable polyester of a polybasic acid of which at least the major proportion is an alpha-beta unsaturated dicarboxylic acid and a polyhydric alcohol of which at least the major proportion is a diol conforming to the formula

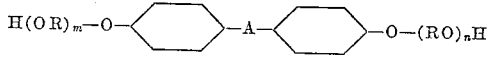

wherein R is an alkylene radical having from 2 to 3 carbon atoms, A is a 2-alkylidene radical having from 3 to 4 carbon atoms, $m$ and $n$ are each at least one, and the average sum of $m+n$ is not over 3.

15. Laminating stock as in claim 14 wherein the said polyester is a fumarate of a symmetrical di-(hydroxyalkyl) ether of 2,2-di-(4-hydroxyphenyl) propane.

16. Dry non-tacky laminating stock as in claim 15 wherein the polymerizable vinyl monomer is diallyl phthalate.

17. Dry, non-tacky laminating stock comprising cellulosic sheet material impregnated with a resin mixture consisting essentially of 67% by weight of the fumarate polyester of 2,2-di(4-hydroxypropoxy phenyl) propane, 14% diallyl phthalate, 19% water-soluble melamine-formaldehyde condensation product and a vinyl polymerization catalyst.

18. Laminating stock as in claim 17 wherein the said cellulosic sheet material is paper.

19. A laminated product comprising layers of cellulosic sheet material impregnated and bonded together with a cured resinous mixture comprising a water-soluble melamine-formaldehyde condensation product and a polymerizable polyester of a polybasic acid of which at least the major proportion is an alpha-beta unsaturated dicarboxylic acid and a polyhydric alcohol of which at least the major proportion is a diol conforming to the formula

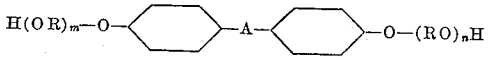

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 3.

20. A laminated product comprising layers of cellulosic sheet material impregnated and bonded together with a cured resinous mixture comprising a water-soluble melamine-formaldehyde condensation product; a polymerizable polyester of a polybasic acid of which at least the major proportion is an alpha-beta unsaturated dicarboxylic acid and a polyhydric alcohol of which at least the major proportion is a diol conforming to the formula

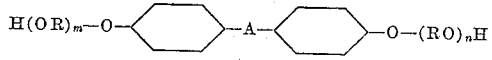

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 3; and a vinyl monomer of boiling point above 100° C., copolymerizable with said polyester.

21. A laminated product as in claim 20 wherein the said cellulosic sheet material is paper.

22. A laminated product as in claim 21 wherein the said polyester is a fumarate of a symmetrical di(hydroxyalkyl) ether of 2,2-di-(4-hydroxyphenyl) propane.

23. A laminated product as in claim 22 wherein the said vinyl monomer is diallyl phthalate.

References Cited in the file of this patent

UNITED STATES PATENTS

| | | |
|---|---|---|
| 2,486,201 | Patterson | Oct. 25, 1949 |
| 2,618,616 | Tess et al. | Nov. 18, 1952 |
| 2,720,500 | Cody | Oct. 11, 1955 |

FOREIGN PATENTS

| | | |
|---|---|---|
| 540,169 | Great Britain | Oct. 8, 1941 |